Figure 1:
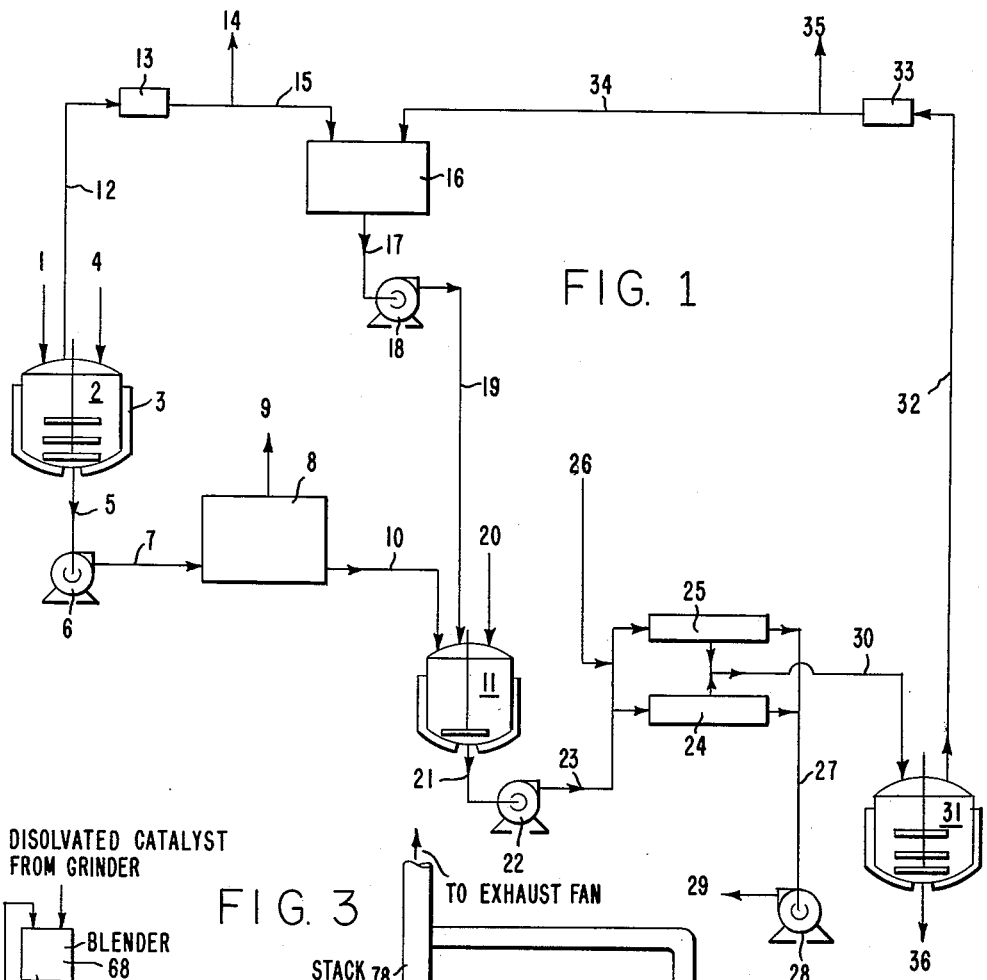

June 4, 1963          S. N. VINES          3,092,451

RECOVERY OF ACRYLONITRILE CATALYST

Filed July 2, 1959          2 Sheets-Sheet 1

INVENTOR
STERLING N. VINES

BY *Norris E. Ruckman*
ATTORNEY

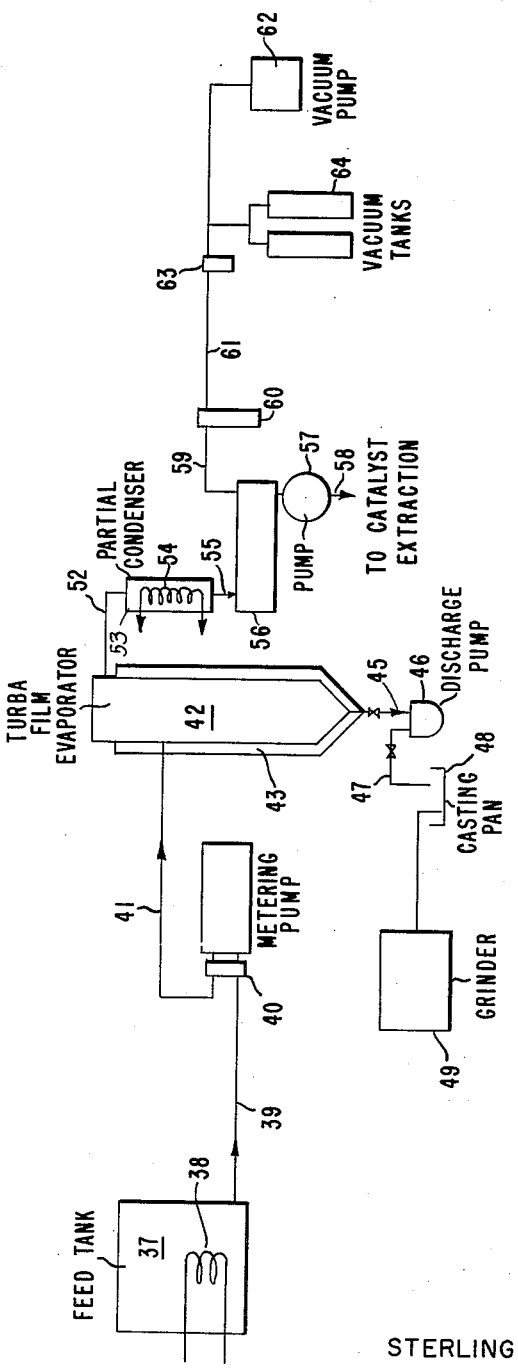

United States Patent Office 3,092,451
Patented June 4, 1963

3,092,451
RECOVERY OF ACRYLONITRILE CATALYST
Sterling N. Vines, Memphis, Tenn., assignor to E. I. du Pont de Nemours and Company, Wilmington, Del., a corporation of Delaware
Filed July 2, 1959, Ser. No. 824,636
6 Claims. (Cl. 23—97)

This invention relates to the recovery of values from anhydrous catalyst solutions used in the synthesis of acrylonitrile, and is more particularly concerned with treatment of spent catalyst solutions, formed in the production of acrylonitrile by reaction of hydrogen cyanide with acetylene in organic liquid containing cuprous chloride, to recover the organic liquid and the copper content as cuprous chloride. This application is a continuation-in-part of applicant's copending application, Serial No. 741,943, filed June 13, 1958, and now abandoned.

A well-known commercial process for producing acrylonitrile involves continuously passing hydrogen cyanide and acetylene through a reactor containing an aqueous solution of cuprous chloride catalyst at a temperature of 70°–100° C. The resulting liquid phase reaction produces a variety of water-insoluble by-products in addition to the desired acrylonitrile. The more volatile by-products pass out of the reactor with the acrylonitrile and unreacted hydrogen cyanide and acetylene, but a mixture of by-products accumulates in the reactor and will soon stop the process unless it is removed. This mixture of by-products is a highly viscous, very dark, tarry material, which is reasonably fluid at the reaction temperature but solidifies at room temperature. It is a relatively easy matter to drain a sufficient amount of such water-insoluble tars from the reactor to avoid an excessive accumulation.

The use of nonaqueous organic solvent solutions of cuprous chloride instead of aqueous catalyst solutions in the above process decreases by-product formation, as by avoiding the formation of acetaldehyde by reaction of acetylene with water. Furthermore, anhydrous organic liquid catalyst systems have recently been found which also provide potentially important improvements in productivity, by greatly increasing the activity and useful life of the catalyst in some unexplained manner. However, the tarry by-products formed are soluble in the organic liquids used. These by-products dilute the catalytic reaction system, increase its viscosity and cause the productivity per unit volume of catalyst to drop when the concentration reaches about 20% of tar, the operation becoming uneconomical at tar concentrations approaching 30%. It is therefore necessary to replace the catalyst medium contaminated with dissolved by-product tars, either continuously or intermittently, with fresh components at a rate which will remove undesirable amounts of tar from the system.

Since disposal of such tarry mixtures is a troublesome problem and the components of nonaqueous catalyst solutions are expensive, an effective process for recovery of values therefrom and preferably as components suitable for reuse in the catalyst medium, especially one leaving waste in a form which is readily disposed of, is highly desirable.

It is an object of this invention to provide a process for the recovery of values from anhydrous liquid catalyst after use in the synthesis of acrylonitrile. Another object is to provide a process for recovering organic liquids and cuprous chloride from spent nonaqueous liquid catalyst medium for reuse in the production of acrylonitrile. A further object is to provide such recovery processes which simplify waste disposal. Other objects will become apparent from the specification and claims.

In accordance with this invention it has been found that anhydrous organic liquid solutions of cuprous chloride catalyst containing 10% to 30% of non-volatile tarry by-products resulting from use in the production of acrylonitrile can be effectively treated to accomplish the above objectives by (1) evaporating organic liquids which are volatile at temperatures up to 250° C. under sub-atmospheric pressure to form a desolvated mixture, (2) heating the desolvated mixture at 225° to 450° C., preferably in the presence of hydrogen chloride, to form a pulverulent residue of insolubilized or charred by-products containing cuprous chloride, and (3) dissolving the cuprous chloride in an organic solvent.

This invention is applicable to the recovery of any nonaqueous catalyst mixture for the synthesis of acrylonitrile containing cuprous chloride dissolved in organic solvent after non-volatile by-products have accumulated therein to the extent that catalyst replacement in whole or in part becomes advisable. Generally, the by-product or tars content will exceed about 10% by weight of the catalyst mixture before recovery of values becomes advisable, but recovery becomes necessary when this content exceeds about 30%.

The organic liquid or liquids to be evaporated in the first step of the process may be any of a large class of known organic solvents for cuprous chloride. Generally solvents will be used for preparing the catalyst solution which will dissolve at least about 20% by weight of cuprous chloride at the reaction temperature used in order to make possible a high rate of acrylonitrile prodution. Organic nitriles such as the hydrocarbon nitriles and their halogenated or alkoxy derivatives are good solvents. Examples are benzonitrile, tolunitrile, chlorobenzonitrile, methoxybenzonitrile, naphthonitrile, phenylacetonitrile, phenylpropionitrile, phenylbutyronitrile, tetrahydrobenzonitrile, propionitrile, butyronitrile, valeronitrile, trimethylacetonitrile, chloracetonitrile, chloropropionitrile, bromopropionitrile, methoxypropionitrile, dimethylaminopropionitrile, chlorobutyronitrile, bromobutyronitrile, bromovaleronitrile, crotononitrile, succinonitrile, glutaronitrile, adiponitrile and α-methyladiponitrile.

Fore highly effective synthesis of acrylonitrile from hydrogen cyanide and acetylene it is advantageous to have present in the catalyst mixture an organic promotor to the extent of about 0.2% to not over about 15% by weight of the mixture. The promoter used should preferably boil above about 100° C. and should be volatilizable at a temperature not exceeding about 250° C. at a pressure of about 40 mm. mercury. Promoters of the amide type are especially advantageous and among the amide promoters the lower dialkyl formamides have been found to be particularly useful.

In general it is possible to recover the volatiles (solvent and organic promoter) from used catalyst to the extent of about 95% by subjecting the used catalyst to a temperature between about 125° to 210° C. under a partial vacuum between about 20 to 100 mm. of mercury pressure. Most of the remainder of the volatiles can be recovered during the subsequent "charring" operation whereby the acrylonitrile synthesis by-product tars are rendered insoluble in the organic solvent. Vacuum distillation is preferred because recoveries are higher and corrosion of equipment lower than at atmospheric pressures.

It is to be understood that the solvent together with organic promoter, if present, may be vaporized to effect separation from the cuprous chloride and the nonvolatile by-product tars by any desired method such as azeotropic distillation, distillation at ordinary pressures, or vacuum distillation, and not depart from the scope of this invention.

It is possible to recover substantially all of the cuprous chloride in the used catalyst but varying portions of the copper originally present as the chloride are converted to other forms which are insoluble in the organic solvents and are thus not directly recoverable. Any cuprous cyanide present is relatively insoluble but heat may convert it either to metal or to chloride depending upon the presence or absence of hydrogen chloride or equivalent compound of chlorine present during the recovery steps. Any copper present as the metal is not recoverable and will inevitably be found in the "charred" residues after solvent extraction. However, by maintaining suitable conditions during the recovery operations it will be possible to recover at least about 90% of the copper, as cuprous chloride, from the used catalst. It has also been found that the catalyst undergoing recovery for values should be treated with hydrogen chloride at one or more stages to effect efficient and more complete recovery of cuprous chloride. The remainder of the copper values in the "charr" not extractable by solvents can be recovered by other operations not here further detailed, and not a part of the present invention.

Reduction to copper metal during the heating steps can be avoided by maintaining oxygen in contact with the copper catalyst, as by heating in an atmosphere containing air, but this will not convert cuprous cyanide to cuprous chloride. Moreover, cuprous chloride values are lost in other ways which become highly important at the temperatures used in the charring step. In accordance with the preferred embodiment of this invention, losses in this step are substantially avoided regardless of whether or not oxygen is present. In fact, it is generally desirable to use a non-oxidizing atmosphere. It has been found that surprisingly higher recoveries of cuprous chloride are achieved in this heating step when the catalyst mixture is heated in an atmosphere containing hydrogen chloride as the principal component (over 50% and preferably 75-100% HCl), than are obtained with an inert gas, such as nitrogen. Even with inert gas mixtures containing a minor proportion of hydrogen chloride, there is a serious loss of copper values in the process, a loss which is more than twice the unrecovered copper values when atmospheres in which hydrogen chloride is the major component are used in the process.

The "charring" or insolubilization of the by-product tars may be conducted at a temperature between about 225° to 450° C., but a range between about 250° to 420° C. is preferred and it is advisable to stir the mass so that the "charr" or insolubilized tars will be as finely pulverulent as possible since extraction of the cuprous chloride with organic solvent proceeds best with the smaller particles. The charring step may be conducted at atmospheric pressure or any other convenient pressure.

The cuprous chloride is readily extracted from the pulverulent charr with an organic solvent, since the other components are insoluble in solvents for cuprous chloride except that any ammonium chloride present will dissolve. Ammonium chloride is normally removed by the charring step and any difficulty with this salt is easily avoided by control of the charring conditions. Any of the solvents for cuprous chloride mentioned previously may be used. A solvent or mixture of organic liquids may be used which is the same as that used in the catalyst solution to give a recovered cuprous chloride solution suitable for reuse directly in the anhydrous liquid acrylonitrile catalyst solution. The organic volatiles recovered in the desolvation step may be used to recover the cuprous chloride and recycled as make-up catalyst solution to the reactor after replacement of losses in the recovery process. An alternative, but generally less desirable method, is to extract the cuprous chloride from the charr with any convenient solvent, and then evaporate the solvent to give dry cuprous chloride for reuse in preparing catalyst solution.

Figure 3:
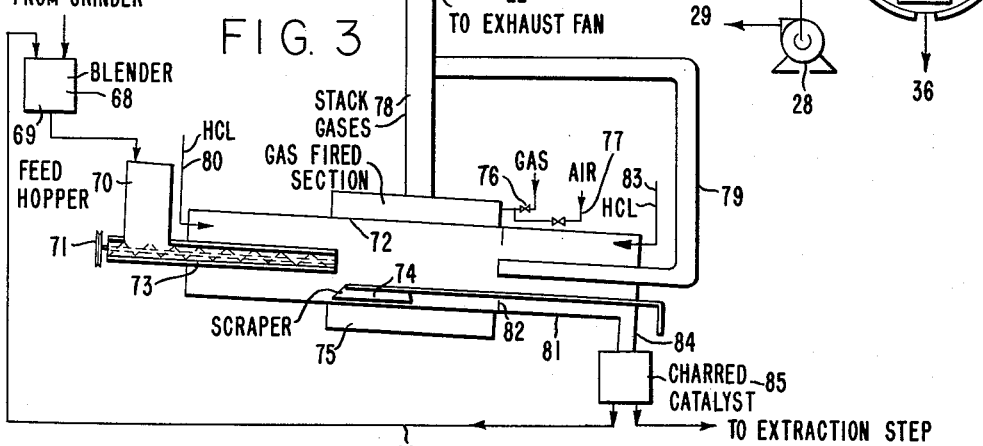

Embodiments of the invention will be illustrated by reference to the drawing wherein, FIGURE 1 is a diagrammatic representation of an arrangement of apparatus suitable for carrying out the process of this invention, FIGURE 2 shows in more detail apparatus for performing the step of evaporating volatile liquids from the catalyst mixture, and for recovering organic solvents from the vapors for reuse, and FIGURE 3 shows in more detail a suitable form of apparatus for the charring step of the process.

Referring to FIGURE 1, used catalyst is continuously or periodically removed from the acrylonitrile reactor, not shown, at a suitable rate which may, for example, be 10% per 24 hours of the total catalyst mixture. This withdrawn used mixture is fed by way of line 1 into a suitable vessel such as a Dopp kettle 2 provided with jacket 3 for heat input to evaporate the volatile organic liquids (volatilize the organic solvent and promoter, specifically benzonitrile and dimethyl formamide, at about 125° C. and 0.4 p.s.i.a. (pounds per square inch absolute pressure)). Inert gas, such as nitrogen, may be used to flush the vessel and enters by way of line 4. The contents are stirred while the solvents are volatilized and the molten residue comprising the cuprous chloride and by-product tars is then transferred through lines 5 and 7 propelled by impeller 6 into a rotating kiln 8 which may operate at atmospheric pressure and which may be heated by any of the usual methods, not shown, to a temperature of about 350° C. such that the contained by-product tars will be partially charred or at least rendered insoluble in the catalyst solvent. Vapors leaving the kiln by way of line 9 may be cooled and the condensibles trapped by any desired means not shown. The insolubilized tars and cuprous chloride form a pulverulent mass which is transferred to the extraction vessel or slurry tank 11 by way of line 10, in which the cuprous chloride is dissolved by the organic solvent and thus separated from the insolubilized tars.

The volatilized solvent vapors leaving the Dopp kettle by way of line 12 are recovered by liquefication in cooler 13. Reduced pressure is applied to the kettle by a pump or other means not shown at 14 and the liquid solvent passes from the cooler 13 by way of line 15 to solvent reservoir 16 to which solvent from other sources may also be added. Solvent is transferred from reservoir 16 through 17 and 19 by way of actuating means 18 to the extraction vessel 11. As required, additional solvent and cuprous chloride may be added to the extraction vessel by way of line 20. The slurry of cuprous chloride, solvent and insolubilized tars is transferred by way of lines 21, 22 and 23 to filters 24 and 25 which may be operated in sequence according to usual chemical engineering practice. Solvent from any source such as 26 may be circulated to filters 24 and 25 to wash the cake comprising mainly insolubilized tars. The solvent extract and washings may contain up to 90% and more of the cuprous chloride and this is recycled to the acrylonitrile reactor, not shown, by way of lines 27, 28 and 29.

The extracted insolubilized tars from the filters 24 and 25 are transferred by way of line 30 to a vessel 31 similar to vessel 2 to recover the solvent adhering to the filter cake. Recovered solvent vapor is removed via line 32, cooler 33 and finally the condensed solvent may be sent to solvent reservoir 16 by way of line 34. Pressure reduction for the vaporization of solvent in vessel 31 is applied at 35 in a manner similar to 14 above. Insolubilized byproduct tars finally are discharged from the system at 36 for suitable disposal by methods not further considered here.

FIGURE 2 shows in more detail a suitable arrangement of apparatus for desolving used catalyst and recovering the volatile materials. Feed tank 37 is provided with heating coil 38 for maintaining the used catalyst mixture in a fluid state. The mixture passes through line 39 to metering pump 40 and is pumped continuously through line 41 into a film type evaporator 42 having a rotor speed of 1000–2000 revolutions per minute. The evaporator is provided with a steam jacket 43 for heating the evaporating surface up to the temperature required to drive off the volatiles. The desolvated catalyst is continuously withdrawn from the evaporator through line 45 by discharge pump 46 and passed through line 47 into a casting pan 48. The desolvated mixture of copper salts and by-product tars solidifies upon cooling and is broken into small particles in grinder 49.

The vaporized organic liquids leave the evaporator by way of line 52 and are recovered in partial condenser 53. The cooling means 54 is maintained at a temperature which will pass acrylonitrile and condense higher boiling liquids. The liquids and vapors pass through line 55 into solvent tank 56, where the condensed liquids are collected and then removed by pump 57 and line 58 to the catalyst extraction operation described in connection with FIGURE 1. The uncondensed vapors, consisting principally of acrylonitrile and hydrogen cyanide, separated in solvent tank 56 and pass through line 59 to total condenser or trap 60 for recovery. The system is exhausted through line 61 leading from the total condenser to vacuum pump 62, suitable for maintaining an absolute pressure of about 50 mm. of mercury in the evaporator. Vacuum tanks 64 and pressure regulator 63 are provided to assist the vacuum pump in maintaining the desired low pressure.

The rotating kiln 8, indicated diagrammatically in FIGURE 1, may be as shown in FIGURE 3. The desolvated catalyst mixture to be charred will usually have the approximate composition of 55 to 70% cuprous salts, principally cuprous chloride, and 25 to 40% tars, together with a small percentage of unvolatilized solvent and ammonium chloride. Sticking during feeding into the kiln at the higher range of tar contents can be avoided by blending with recycled charred catalyst. Desolvated catalyst from the grinder is mixed with recycled charr in blender 68 and is then conveyed by way of line 69 into feed hopper 70. A variable speed screw feeder 71 is used to introduce the mixture into the heated section 72 of the cylindrical kiln. This screw is provided with a water-cooled jacket 73 to prevent sticking.

The kiln is rotated slowly in the conventional manner for such equipment to mix the material and expose it uniformly to the heated surface and atmosphere. A stationary scraper bar 74 is arranged to rub against the inside of the heated cylinder to keep the surface free of deposits and assist in moving the material through the kiln. The kiln is surrounded with a gas-fired jacket 75 which provides the heat for charring the tars. Gas is supplied through line 76 and mixed with air supplied through line 77 for combustion. The combustion gases exhaust to the stack through conduit 78. The off-gases formed in charring the tars are exhausted from the kiln through conduit 79 and likewise pass to the stack. Conduit 79 is insulated to avoid condensation in the line.

A hydrogen chloride atmosphere is maintained in contact with the heated catalyst mixture by introducing hydrogen chloride into the feed end of the kiln through line 80. Since the hydrogen chloride is diluted by gases produced in charring the tars, a feed rate of about 15 to 40 lbs. HCl/100 lbs. of desolvated catalyst mixture is desirable in order to avoid dilution to an extent which will seriously reduce the amount of cuprous chloride subsequently recovered. The catalyst mixture is heated to about 400° C. and retained for about one-half hour in heated section 75; it then passes into a cooling section 81 of the kiln. The retention time can be controlled by adjusting the incline of the kiln and by the use of a retention ring 82 of suitable size at the exit end of the heated section. The charred catalyst mixture is cooled sufficiently in section 81 to avoid oxidation upon exposure to air. Hydrogen chloride can be introduced into this section through line 83, if necessary, to supplement that introduced at the other end of the kiln through line 80. The catalyst passes from the kiln through exit conduit 84 into a feed hopper 85 for the cuprous chloride extraction step of the process described previously in connection with FIGURE 1. A portion of this charred catalyst may also be recycled through line 86 to blender 68 for the purpose already described.

The following examples illustrate specific embodiments of the invention:

Example 1

A 4-liter glass vessel, set up for vacuum distillation, was charged with 4771 grams of used catalyst mixture having a composition by weight of about 31.1%, CuCl, 3.65% CuCN, 41.77% volatiles (benzonitrile and dimethyl formamide) and 23.48% by-product tars formed during the production of acrylonitrile from HCN and $C_2H_2$. The volatiles were distilled from the catalyst mixture at 40 mm. pressure over a temperature range of 120–230° C. and nearly 90% of the contained solvent was recovered. The oil bath surrounding the kettle was replaced with Woods metal and heating continued to a final temperature of 340° C. The vessel was not provided with a stirrer and since heat transfer was poor, the "charring" step was long and tedious. After cooling the vessel and contents, the "charred" residue was ground to roughly 30–50 mesh size. This material, about 2163 grams, was then extracted at 150° C. with recovered benzonitrile. The solution of cuprous chloride in benzonitrile was separated from the "charred" by-products by filtration and the solvent was then removed from the cuprous chloride by vacuum distillation. 400 g. CuCl was recovered and when used to prepare a fresh catalyst a space-time yield comparable to the original catalyst was obtained. Additional cuprous chloride was extracted from the filtered residue resulting in a total recovery of 53.5% of the cuprous chloride present in the used catalyst mixture.

Example 2

Used catalyst, 4301 grams, consisting by weight of approximately 4.8% CuCN, 29.6% CuCl, 40.0% volatiles (benzonitrile and dimethyl formamide) and 24.3% by-product tars was subjected to distillation in a Dopp type vessel at 178° C. and 35 mm. pressure. The volatiles recovered accounted for 91.5% of those present in the used catalyst and had a purity of over 99%. After releasing the vacuum in the vessel by admitting nitrogen, the residue of copper compounds and by-product tars was subjected to increased temperature to insolubilize the tars. Stirring was maintained through all the operations. During the first hour of "charring" the evolved gases consisted mainly of $CO_2$ and CO with minor amounts of ethylene and acetonitrile. Traces of water, ammonia and an unidentified compound were also found. After one hour the wall temperature of the vessel reached 375° C. and then the major products evolved were $NH_3$ and CO with minor amounts of methane and acetonitrile together with traces of $CO_2$, water and unidentified components. The wall temperature then rose to 365° C. and was maintained at this point for some 12 hours. The condensible materials collected during the "charring" cycle were primarily benzonitrile and ammonium chloride together with a variety of organic decomposition products not identified. The residue in the vessel after cooling was separated into fractions as sublimed ammonium chloride 67 g., material caked on the stirrer 466 g. (containing some ammonium chloride) and powdered charred residue 1812 g. The powdered material passing a 100-mesh screen amounted to 898 grams and was treated with benzonitrile to extract the cuprous chloride. This material contained 42.2% total copper and 16.6% chloride principally as CuCl. The mole ratio of chlorine to copper was about .705 showing that not all of the copper was present as the chloride. There was present no detectable cyanide and X-ray diffraction analysis showed the presence of cuprous chloride together with unidentified crystalline compound probably containing copper. This mass of 898 grams was subjected to five successive extraction operations at a temperature of about 140° C. The first extraction recovered 32.6% cuprous chloride, the second 8.1% and the third 7%. Before the fourth extraction, the mass was treated with anhydrous hydrogen chloride and the extract then accounted for 15.9% of cuprous chloride. The fifth and final extraction removed 3.9% cuprous chloride. The total recovery was 67.5% of the copper present in the powdered material. The residue after these five extractions contained 16.6% copper but not as the chloride. The solution of the recovered cuprous chloride in the recovered volatiles was suitable as a catalyst mixture for the synthesis of acrylonitrile.

*Example 3*

Used catalyst, containing 22.9% by weight CuCl, 11.4% CuCN, 44.9% volatiles (benzonitrile and dimethyl formamide) and 20.8% by-product tars, was fed continuously at a rate of 55 parts by weight per hour into a film evaporator of the type described and illustrated in FIGURE 2. The evaporator was operated with a rotor speed of 1880 r.p.m., a vacuum pressure of 25 mm. Hg abs., and a jacket temperature of 170° C. to vaporize most of the volatiles at a temperature of 96° C. and discharge the remainder of the mixture at 149° C. Recovery of volatiles was 91.8% of the amount in the feed. The discharged catalyst mixture, containing 6.28% volatiles, 58.3% copper salts and 35.4% tars, was cooled and ground to about 200-mesh size powder.

The ground material was then treated to insolubilize the tars in an apparatus of the type disclosed in connection with FIGURE 3. It was mixed with five times its weight of recycled treated material to prevent sticking and fed continuously at a rate of 12 parts by weight per hour into a rotary kiln. The kiln was rotated at 3.1 r.p.m., sloped downward ⅛ inch per foot to cause the catalyst mixture to progress slowly toward the exit, and was of a size which provided a retention time of about one hour in the kiln. Hydrogen chloride was introduced into the kiln at a rate of about 24 lbs./100 lbs. of previously untreated catalyst material in the feed (4% of the total feed of 5/1 mixture). The catalyst mixture was heated to 390° C. in this hydrogen chloride atmosphere to insolubilize the tars. The treated material discharged from the kiln was a black powder analyzing 37.3% Cu, substantially all present as cuprous chloride. Ammonium chloride resulting from the pyrolysis was vaporized and removed in the off-gases from the kiln.

A major part of the treated material was recycled for mixing with fresh feed of untreated catalyst material, as described previously. Another part of the treated material was extracted with recovered solvents. The copper recovered, in the form of cuprous chloride, was 88.4% of the initial copper content of the material treated in the continuous operation. The resulting solution of cuprous chloride was suitable for reuse as catalyst in the production of acrylonitrile. The residual insolubilized organic material was in an innocuous form which could readily be disposed of without difficulty.

The importance of maintaining a high concentration of hydrogen chloride in the kiln atmosphere is illustrated by a run made under the same conditions as in Example 3 except that the hydrogen chloride was mixed with an equal volume of nitrogen. In this run, 32.5% of the copper initially present could not be recovered by extraction, whereas only 11.6% of the copper was lost under the conditions of Example 3. In another run, a mixture of about 17% hydrogen chloride and 83% nitrogen was introduced into the kiln at about the same feed rate for the HCl component as in Example 3. In this case, 39.5% of the copper initially present was not recovered in the extraction step. This unrecovered copper is a serious economic loss and the presence of copper in the form of copper cyanide salts greatly increases the problem of waste disposal.

Since many different embodiments of the invention may be made without departing from the spirit and scope thereof, it is to be understood that the invention is not limited by the specific illustrations except to the extent defined in the following claims.

I claim:

1. In the process for the recovery of values from anhydrous catalyst after use in the synthesis of acrylonitrile, said used catalyst comprising a solution of cuprous salts in organic solvent and non-volatile by-products of the synthesis, the steps comprising recovery by volatilization of the major portion of the organic solvent, then heating the unvolatilized residue to a higher temperature in an atmosphere comprising hydrogen chloride to render the non-volatile by-products insoluble in said organic solvent and extracting cuprous chloride therefrom with organic solvent.

2. In the process for the recovery of values from anhydrous catalyst after use in the synthesis of acrylonitrile, said catalyst comprising a solution of cuprous chloride in organic solvent and non-volatile by-products of the synthesis, the steps comprising recovery by volatilization under partial atmospheric pressure of the major portion of the organic solvent, then heating the unvolatilized residue in the presence of anhydrous hydrogen chloride to a higher temperature to render the non-volatile by-products insoluble in said organic solvent and extracting the cuprous chloride therefrom with organic solvent removed from said used catalyst by evaporation.

3. In the process for the recovery of values from a catalyst mixture used for the synthesis of acrylonitrile from hydrogen cyanide and acetylene, said mixture comprising cuprous chloride dissolved in an organic nitrile boiling above 100° C. and by-product tars from said synthesis, the steps comprising heating the used catalyst mixture at a temperature between about 125° to 210° C. under a reduced pressure at which said nitrile will boil, recovering the volatilized nitrile, then heating the residue comprising cuprous chloride and by-product tars to a temperature between about 225° and 450° C. to render said by-product tars insoluble in said nitrile, treating the residue with anhydrous hydrogen chloride and extracting the cuprous chloride from the heated residue with said nitrile.

4. A process for the recovery of organic solvent and copper values from used anhydrous acrylonitrile catalyst mixture containing cuprous salts dissolved in a volatile solvent boiling above 100° C. and non-volatile by-products from the synthesis of acrylonitrile which comprises evaporating a major portion of the volatile solvent from the catalyst mixture, recovering said solvent, then heating the remainder of the mixture at a temperature between 225° and 450° C. to render said by-products insoluble in an organic solvent for cuprous chloride, said heating being conducted in the presence of anhydrous hydrogen chloride to give a residue of cuprous chloride and insolubilized by-products, then cooling the residue and dissolving the cuprous chloride in said organic solvent to recover copper values from said insolubilized by-products.

5. A process for the recovery of organic solvent and copper values from used anhydrous acrylonitrile catalyst solution of cuprous salts, volatile solvent boiling above 100° C. and by-product tars from synthesis of acrylonitrile which comprises heating said solution at temperatures up to 250° C. under reduced pressure to volatilize said organic solvent, recovering the volatilized solvent, then heating the unvolatilized residue in a non-oxidizing atmosphere containing over 50% hydrogen chloride and at a temperature between 250° and 420° C. to form a mixture of cuprous chloride with material insoluble in an organic solvent for cuprous chloride, then cooling the mixture and extracting the cuprous chloride with said organic solvent.

6. A process for the recovery of organic solvent and copper values from used anhydrous acrylonitrile catalyst solution of cuprous chloride and other salts, volatile organic nitrile solvent for cuprous chloride boiling above 100° C. and by-product tars from synthesis of acrylonitrile which comprises vaporizing volatile materials from said solution at temperatures up to 250° C. under reduced pressure to leave a substantially non-volatile residue, condensing said nitrile solvent from said vapors to recover the solvent, then charring the unvolatilized residue at a higher temperature up to 420° C. in an atmosphere of 75% to 100% hydrogen chloride to form a mixture of copper salts and material insoluble in said nitrile solvent having a cuprous chloride content equivalent to at least 80% of the total initial copper values in said catalyst solution, then cooling the mixture and dissolving the cuprous chloride in said nitrile solvent.

References Cited in the file of this patent

UNITED STATES PATENTS

| | | |
|---|---|---|
| 2,621,204 | MacLean et al. | Dec. 9, 1952 |
| 2,632,737 | Stehman | Mar. 24, 1953 |
| 2,748,157 | Taylor | May 29, 1956 |
| 2,920,098 | Burrus et al. | Jan. 5, 1960 |

OTHER REFERENCES

Comey and Hahn: A Dictionary of Chemical Solubilities (Inorganic), page 297, 2nd edition, 1921, Macmillan Co. N.Y.